United States Patent
Boyer

(10) Patent No.: US 9,514,406 B2
(45) Date of Patent: Dec. 6, 2016

(54) DEVICE FOR ANALYZING AND CLASSIFYING A MOBILE TERMINAL APPLICATION FOR A DOCKING STATION OF A MOTOR VEHICLE

(75) Inventor: Jean-Philippe Boyer, Le Chesnay (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 218 days.

(21) Appl. No.: 14/003,479

(22) PCT Filed: Mar. 30, 2012

(86) PCT No.: PCT/EP2012/001410
§ 371 (c)(1),
(2), (4) Date: Oct. 1, 2013

(87) PCT Pub. No.: WO2012/136332
PCT Pub. Date: Oct. 11, 2012

(65) Prior Publication Data
US 2014/0019401 A1    Jan. 16, 2014

(30) Foreign Application Priority Data
Apr. 8, 2011 (FR) .................. 11 01072

(51) Int. Cl.
*G06N 7/02* (2006.01)
*G06N 5/02* (2006.01)
*B60K 35/00* (2006.01)
(Continued)

(52) U.S. Cl.
CPC ........... *G06N 5/02* (2013.01); *B60K 35/00* (2013.01); *G06F 9/4443* (2013.01); *B60K 2350/1004* (2013.01); *B60K 2350/355* (2013.01); *B60K 2350/357* (2013.01); *B60K 2350/906* (2013.01); *B60K 2350/962* (2013.01); *G06F 21/44* (2013.01); *G06N 7/02* (2013.01)

(58) Field of Classification Search
None
See application file for complete search history.

(56) References Cited

U.S. PATENT DOCUMENTS

2011/0021234 A1   1/2011   Tibbitts et al.
2011/0288724 A1   11/2011  Falk

FOREIGN PATENT DOCUMENTS

CN    101977146    2/2011
EP    2 012 090 A2    1/2009
(Continued)

OTHER PUBLICATIONS

Dong, et al., Driver Inattention Monitoring System for Intelligent Vehicles: A Review, IEEE Transactions on Intelligent Transportation Systems, vol. 12, No. 2, Jun. 2011, pp. 596-614.*
(Continued)

*Primary Examiner* — Wilbert L Starks
(74) *Attorney, Agent, or Firm* — Young & Thompson

(57) ABSTRACT

A device for analyzing and classifying (4) a mobile terminal (2) application (3), for a docking station (1) of a motor vehicle capable of interfacing a mobile terminal (2) and of supporting at least one application (3) of the mobile terminal (2) and offering at least one remote interface element (8) replacing the interface element of the mobile terminal (2) for the application (3), includes an analysis element capable of analyzing a data flow (7) exchanged between the application (3) and the docking station (1) and a classifying element capable of determining an application type (13) according to this analysis, in order that the docking station (1) can determine, according to the driving conditions (9) of the motor vehicle, whether the application (3) is or is not authorized to access the at least one interface element (8).

20 Claims, 1 Drawing Sheet

(51) Int. Cl.
*G06F 9/44* (2006.01)
*G06F 21/44* (2013.01)

(56) References Cited

FOREIGN PATENT DOCUMENTS

| | | |
|---|---|---|
| JP | 2009140090 | 6/2009 |
| WO | 2009/127522 A1 | 10/2009 |
| WO | 2010/057776 A1 | 5/2010 |
| WO | 2011/047045 A1 | 4/2011 |

OTHER PUBLICATIONS

International Search Report, dated May 23, 2012, from corresponding PCT application.

* cited by examiner

DEVICE FOR ANALYZING AND CLASSIFYING A MOBILE TERMINAL APPLICATION FOR A DOCKING STATION OF A MOTOR VEHICLE

BACKGROUND OF THE INVENTION

The present invention relates to a device for analyzing and classifying a mobile terminal application.

In the field of the use of mobile terminals in association with motor vehicles, there is a known way of using a docking station positioned in a motor vehicle and enabling the interfacing of a mobile terminal and the use of an application running on said mobile terminal, via interface means integrated with the vehicle operating in place of the interface means of said mobile terminal.

Thus a user can access applications present on his mobile terminal from his vehicle, in a driving situation or otherwise.

However, because of the mental load that this may create, such use of an application in a motor vehicle may prove to be highly dangerous, depending on the driving conditions. In such cases the user's distraction should be limited and any use of this kind should be prevented. It is therefore necessary to estimate said mental load. This mental load can be summarized in the form of a type associated with the application.

There is a known mechanism by which the application itself indicates its application type to the docking station. However, the reliability of this indication is questionable. This is because the information about the application type may be falsified either within the application or during its transfer from the mobile terminal toward the docking station.

There is also a known mechanism for certification of the application type at source. This mechanism does not resolve all the difficulties. The question of liability remains unanswered. Any non-certified application is unauthorized by default. This reduces the number of applications that can be used. This mechanism introduces a degree of complexity which tends to increase the time taken to make an application available. Furthermore, this mechanism provides no protection against a falsification of the information on the application type during its transfer between the mobile terminal and the docking station.

If there is an accident during the use of a normally unauthorized application, the manufacturer of the docking station is held liable, even if the station has been misled by a falsified application type.

It will therefore be useful to propose a device capable of determining the type of an application solely on the basis of elements which are entirely verifiable by, and under the control of, the docking station.

SUMMARY OF THE INVENTION

The invention relates to a device for analyzing and classifying a mobile terminal application, for a docking station of a motor vehicle capable of interfacing a mobile terminal and of supporting at least one application of said mobile terminal and offering at least one remote interface means replacing the interface means of the mobile terminal for said application, comprising an analysis means capable of analyzing a data flow exchanged between said application and the docking station and a classifying means capable of determining an application type according to this analysis, in order that the docking station can determine, according to the driving conditions of the motor vehicle, whether said application is or is not authorized to access said at least one interface means.

According to another characteristic of the invention, the analysis means is capable of determining parameters of the data flow.

According to another characteristic of the invention, said parameters comprise a data refresh rate, a display area size, a user interaction speed, and an audio characteristic.

According to another characteristic of the invention, the classifying means analyzes said parameters according to rules for determining an application type.

According to another characteristic of the invention, the classifying means comprises a fuzzy logic engine or a neural network engine.

According to another characteristic of the invention, the classifying means is also capable of determining a degree of certainty associated with the application type.

BRIEF DESCRIPTION OF THE DRAWINGS

Other characteristics, details and advantages of the invention will become clear in the light of the detailed description which is provided below for information only, with reference to the drawings, in which.

DETAILED DESCRIPTION OF THE PREFERRED EMBODIMENTS

Figure 1:
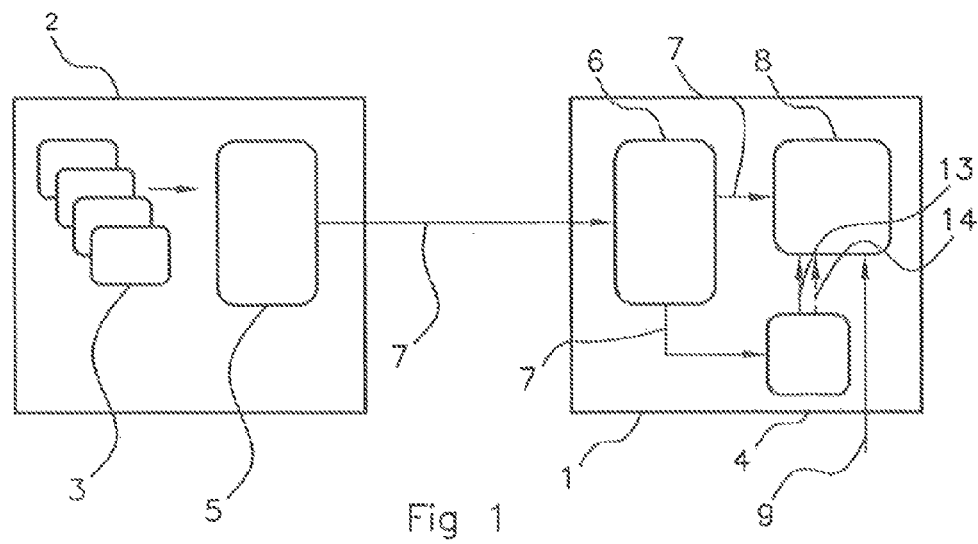
FIG. 1 shows a complete system comprising a docking station and a mobile terminal.

FIG. 1 shows a complete system typical of an environment in which a device 4 according to the invention may operate.

The system comprises a docking station 1 positioned in a motor vehicle (not shown). This docking station 1 typically comprises a processing unit of the computer type, user interface means 8, and means for connection to the other systems of the vehicle or to external systems, such as a mobile terminal 2.

The interface means 8 may comprise output/reproduction means such as at least one display means of the video screen type and/or at least one audio reproduction means such as a loudspeaker. The interface means 8 may also comprise input/interaction means such as at least one keypad or a touch screen. These means are integrated with the motor vehicle and the other human-machine interface means of said motor vehicle. Thus a video screen can be integrated with the dashboard. Similarly, a loudspeaker can be the re-used car radio loudspeaker. An input means may be a dedicated control unit or keypad, or may re-use an existing control unit or keypad, such as those used for controlling a navigation system.

When a user is in the motor vehicle, he may wish to use one of the applications 3 of his mobile terminal 2.

Any application that runs on a mobile terminal is thus potentially available for use. Examples of such applications are those of the multimedia player, photography, games, weather forecasting, stock exchange information, address book, Web browser, email, and other types.

For this purpose, the docking station 1 is designed to offer its remote interface means 8, replacing the interface means of the mobile terminal 2 for said application 3. Thus, for example, a vehicle screen replaces the original screen of the mobile terminal 2, and all displays generated by the application are redirected and displayed on said vehicle screen instead of on the screen of the mobile terminal 2.

The integration into the vehicle and/or the generally larger size of these interface means 8 may provide greater ease of use or media reproduction, while reducing the distraction of the user, thus helping to improve safety.

This mode in which the interface means of a mobile terminal 2 are transferred to a remote location in a vehicle docking station 1 is, for example, defined and developed by the "terminal mode" protocol concept, supported by the CE4A (Consumer Electronics for Automotive) consortium.

The docking station 1 comprises at least one connecting means enabling the mobile terminal 2 to connect to the docking station 1. Examples of connecting means of this type are a USB wire link and a wireless link of the WiFi™ or Bluetooth® type.

When this connection is established, the docking station 1 enables the user to run an application 3 and use his mobile terminal 2 via the interface means 8 of the docking station 1 and/or of the vehicle. When the mobile terminal 2 has been connected to the docking station 1, the user can use his mobile terminal 2 in the same way as he would in normal mode, but without directly handling said mobile terminal 2 in any way. The docking station 1 enables all the interface functions, both for output/reproduction and for input/interaction, to be transferred for remote operation to the interface means 8 of the docking station 1 and/or of the vehicle.

In the present description, a mobile terminal 2 is considered to be any electronic device capable of running an interactive application 3, and includes, but is not limited to, a mobile telephone, a smartphone, a personal digital assistant (PDA), a navigation terminal (GPS), a portable computer, and the like.

In one embodiment, an application 3 is provided on a mobile terminal 2. Said application 3 is run on said mobile terminal 2. The mobile terminal 2 is connected to the docking station 1, and a bidirectional exchange link is established, using a client 6/server 5 pair for example, the server 5 being located in the mobile terminal 2 and the client 6 being located in the docking station 1. This link enables a data flow 7 to be exchanged between the mobile terminal 2 and the docking station 1.

According to a predetermined rule such as the aforementioned "terminal mode" rule, the data flow 7 redirects all the data exchanged between the application 3 and the interface means, the latter being transferred, in this case, to the remote interface means 8 located in or controlled by the docking station 1. The client 6 receives said data flow 7 and transmits it to the interface means 8.

This data flow 7 is also transmitted in parallel, as shown in FIG. 1, or serially, to a device 4 for analyzing and classifying the application 3 according to the invention.

The device 4 for analyzing and classifying an application 3 of a mobile terminal 2 is thus associated with a docking station 1 and is capable of determining an application type 13 for each application 3.

An application type 13 is based on a classification of the applications 3, notably in terms of the requirements for display and/or user interaction, so that said application 3 can be classified according to the mental load that it may impose on the user.

According to this application type 13 determined in this way, the docking station 1 determines, according to the driving conditions 9 at a given instant, whether said application 3 is or is not authorized to access the interface means 8.

The driving conditions 9 may, for example, comprise the following, in increasing order of severity, and therefore in decreasing order of authorization of an application 3:

vehicle stationary;
vehicle at low speed (speed<threshold);
vehicle in motion (speed>threshold).

Similarly, the application types 13 may, for example, comprise:

application with a low mental load: the application includes a fixed display, or no display at all, and/or includes infrequent audio messages;

application with an average mental load: the application includes a display with a slow refresh rate and/or requires infrequent user interactions;

application with a high mental load: the application includes a display with a high refresh rate (of the video type, for example) and/or requires frequent user interactions (in the case of a video game, for example) and/or includes a display comprising a large number of characters per page.

In one embodiment, the interface means 8 of the docking station 1 may not authorize an application 3 of the "high mental load" type unless the driving conditions 9 correspond to "vehicle stationary". Similarly, an application 3 of the "average mental load" type may not be authorized unless the driving conditions 9 correspond to "vehicle stationary" or "vehicle at low speed". On the other hand, an application 3 of the "low mental load" type may be authorized for all of the driving conditions 9, namely "vehicle stationary", "vehicle at low speed", or even "vehicle in motion".

The device 4 for analyzing and classifying an application 3 of a mobile terminal 2 is thus responsible for determining, for an application 3, an application type 13 to be sent to the docking station 1, thereby enabling said docking station 1 to decide whether or not to authorize said application 3.

Figure 2:
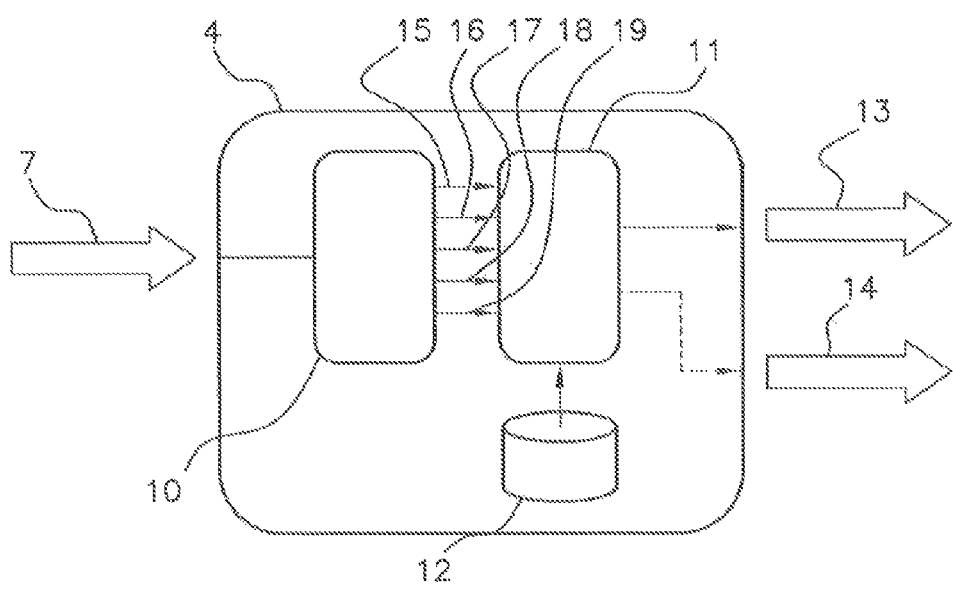
FIG. 2 shows in detail an analysis and classifying device according to the invention.

For this purpose, the device 4 may comprise an analysis means 10 and a classifying means 11 (see FIG. 2). The analysis means 10 is capable of analyzing the data flow 7 exchanged between the application 3 and the docking station 1. The classifying means 11 uses the results of the analysis means 11 and determines an application type 13.

The analysis means 10 analyzes the data flow 7 and extracts from this analysis parameters 15-19 characteristic of this data flow 7.

These parameters 15-19 are chosen according to their relevance for determining a mental load created by the application 3. They may comprise, in a non-exhaustive list:

a refresh rate of the data 15: this parameter typically comprises a volume or frequency of refreshment of the image data to be displayed;

a display area size 16: this parameter typically comprises the extent of the space used for the image data;

a user interaction speed 17: this parameter measures, for example, a quantity or frequency of user interactions required for the operation of the application 3;

a text density in the images to be displayed 18: this parameter may be determined, for example, on the basis of the number and/or size of the typographical characters contained in the images;

an audio characteristic 19: this parameter typically comprises a volume or frequency of refreshment of the audio data to be reproduced.

The analysis means 10 then transmits these parameters 15-19 to the classifying means 11. The classifying means 11 analyzes the values of said parameters 15-19, by means of rules 12 for example, and determines an application type 13.

The rules 12 are predetermined and stored in a rule base accessible to the classifying means 11. A rule 12 may typically take the following form:

```
<Preamble>
    If
<Condition 1>
<Parameter>
    the data refresh rate (parameter 15)
<Relation>
    is greater than
<Value>
    x images/s, and
<Condition 2>
<Parameter>
    the user interaction speed (parameter 17)
<Relation>
    is greater than
<Values>
    y actions/s, and
<Condition 3>
<Parameter>
    the size of the display area (parameter 16)
<Relation>
    is within the range
<Values>
    [z%, z'%] in % of total surface area
<Result>
    then the application type is {TYPE}
```

Given these rules 12, the classifying means 11 finds those which are applicable to the values of the parameters 15-19 received from the analysis means 10 and determines an application type 13.

In view of the type of problem to be resolved by the classifying means 11 (that of finding a result complying as closely as possible with a set of rules), the classifying means 11 advantageously comprises a fuzzy logic engine or possibly a neural network engine, both of these technologies being particularly suitable.

In one embodiment of the classifying means 11, the latter may, in a subsidiary operation, determine a degree of certainty 14 indicating the relevance with which the application type 13 is determined. This degree of certainty 14 can enable the docking station 1 to refine its decision-making, or to make it more reliable, in cases in which the docking station also uses information on the application type sent by the application itself.

Access by an application 3 to the interface means 8 of the docking station 1 should be limited according to the application type 13 and the driving conditions 9.

However, in view of the principle of the analysis and classifying device 4, which requires the analysis of a data flow 7 of an application 3 in the course of operation, it is useful to run said application 3 in order to access the data flow 7 created by the application 3 and be able to analyze it. For this purpose, the application 3 to be tested is initially authorized to use the interface means 8 of the docking station 1. This enables the device 4 to analyze the data flow 7. This enables the device 4 to determine the application type 13, and allows the docking station 1 to prevent access to the application 3 if necessary, these operations taking place in a sufficiently rapid manner to avoid any danger.

In another embodiment, it is also possible to run the application 3 in the background, without authorizing it to access the interface means 8. For certain applications 3, this makes it possible to obtain an indicative data flow 7 and thus to determine an application type 13, enabling the docking station to decide whether or not to authorize the application 3. However, background running in this way is not suitable for all applications 3, and is not indicative, for example, in the case of an application requiring a user interaction.

The invention claimed is:

1. A device for analyzing and classifying (4) a mobile terminal (2) application (3), for a docking station (1) of a motor vehicle that is capable of interfacing with a mobile terminal (2), capable of supporting at least one application (3) of said mobile terminal (2), and having at least one remote interface means (8) capable of performing the functions of the interface means of the mobile terminal (2) for said application (3), the device comprising:

an analysis means (10) that analyzes and outputs an analysis of a data flow (7) exchanged between said application (3) and the docking station (1); and a classifying means (11) that determines and outputs an application type (13) according to said analysis of the data flow, in order that the docking station (1) can determine, according to the driving conditions (9) of the motor vehicle, whether said application (3) is or is not authorized to access said at least one interface means (8).

2. The device as claimed in claim 1, wherein the analysis means (10) is capable of determining parameters (15-19) of the data flow (7).

3. The device as claimed in claim 2, wherein said parameters determined by the analysis means comprise a data refresh rate (15), a display area size (16), a user interaction speed (17), a text density in the images (18), and an audio characteristic (19).

4. The device as claimed in claim 3, wherein the classifying means (11) analyzes said parameters (15-19) according to rules (12) in order to determine an application type (13).

5. The device as claimed in claim 4, wherein the classifying means (11) comprises a fuzzy logic engine.

6. The device as claimed in claim 4, wherein the classifying means (11) comprises a neural network engine.

7. The device as claimed in claim 2, wherein the classifying means (11) analyzes said parameters (15-19) according to rules (12) in order to determine an application type (13).

8. The device as claimed in claim 7, wherein the classifying means (11) comprises a fuzzy logic engine.

9. The device as claimed in claim 7, wherein the classifying means (11) comprises a neural network engine.

10. The device as claimed in claim 1, wherein the classifying means (11) analyzes said parameters (15-19) according to rules (12) in order to determine an application type (13).

11. The device as claimed in claim 10, wherein the classifying means (11) comprises a fuzzy logic engine.

12. The device as claimed in claim 11, wherein the classifying means (11) also outputs a determination of a degree of certainty (14) associated with the application type (13).

13. The device as claimed in claim 10, wherein the classifying means (11) comprises a neural network engine.

14. The device as claimed in claim 13, wherein the classifying means (11) also outputs a determination of a degree of certainty (14) associated with the application type (13).

15. The device as claimed in claim 10, wherein the classifying means (11) also outputs a determination of a degree of certainty (14) associated with the application type (13).

16. A device (4) for analyzing and classifying an interactive application (3), operating on a mobile terminal (2)

that executes the application, while the mobile terminal is in communication with a docking station (1) of a motor vehicle, the device comprising:
- an analysis means (10) that analyzes a data flow (7) exchanged between the mobile terminal (2) and the docking station (1), and outputs an analysis of the data flow (7); and
- a classifying means (11) that, based on said analysis of the data (7) by the analysis means as input, determines and outputs, to the docking station (1), type information describing an application type (13) of the application (3), such that the docking station (1) determines, according to driving conditions (9) of the motor vehicle and the application type as input, whether said application (3) is or is not authorized to access a user interface means (8) of said docking station (1).

17. The device as claimed in claim 16, wherein said analysis means analyzes and outputs at least one measured characteristic of the data flow exchanged between the mobile terminal and the docking station, the at least one characteristic comprising at least one of the group consisting of: a data refresh rate (15), a display area size (16), a user interaction speed (17), a text density in the images (18), and an audio characteristic (19).

18. The device as claimed in claim 17, wherein said classifying means includes a rule base, having rules stored therein, and said classifying means applies said rules to determine the application type of the application operating on the mobile terminal.

19. A system for interfacing a mobile terminal device with a motor vehicle, comprising:
- a docking station (1), including
    - a connecting means for releasably establishing a communication link between the docking station and the mobile device (2) that transports a data flow (7) between the docking station and the mobile terminal device,
    - a remote human-machine interface means (8) configured to perform the functions of a corresponding human-machine interface means of the mobile terminal device for operating and interacting with an application (3) that executes on the mobile terminal device (2) when the mobile terminal device (2) is in communication link with the docking station (1),
    - the docking station (1) that functions to authorize or deny access of the remote human-machine interface means to operate with the mobile terminal device (2), based upon both of i) data indicating an application type (13) of the application (3) and ii) driving conditions (9) of the motor vehicle; and
- a device (4) for analyzing and classifying the application (3), the device including
    - an analysis means (10) that analyzes the data flow (7) exchanged between the mobile terminal device (2) and the docking station (1), and outputs an analysis of the data flow (7); and
    - a classifying means (11) that, based on said analysis of the data flow by the analysis means as input, determines and outputs the data indicating the application type (13) to the docking station (1).

20. The device as claimed in claim 19, wherein said analysis means (10) analyzes and outputs at least one measured characteristic of the data flow exchanged between the mobile terminal and the docking station, the at least one characteristic comprising at least one of the group consisting of: a data refresh rate (15), a display area size (16), a user interaction speed (17), a text density in the images (18), and an audio characteristic (19).

* * * * *